United States Patent [19]

Dauvergne

[11] Patent Number: 4,568,102

[45] Date of Patent: Feb. 4, 1986

[54] MOTOR VEHICLE DASHBOARD AND SEAT ARRANGEMENT

[76] Inventor: Hector A. Dauvergne, 545 Estudillo Ave., San Leandro, Calif. 94577

[21] Appl. No.: 595,039

[22] Filed: Mar. 29, 1984

[51] Int. Cl.⁴ .............................................. B60R 21/04
[52] U.S. Cl. ...................................... 280/752; 180/90; 296/70
[58] Field of Search ................... 180/90; 280/752, 777; 296/70; 74/552, 501 R

[56] References Cited

U.S. PATENT DOCUMENTS

| | | | |
|---|---|---|---|
| 3,613,476 | 10/1971 | Cunningham | 74/552 |
| 3,726,147 | 4/1973 | Spietz | 74/552 |
| 3,883,155 | 5/1975 | Renner et al. | 180/90 |
| 4,042,057 | 8/1977 | Beckley | 180/90 |
| 4,089,545 | 5/1978 | Ferry | 280/752 |

FOREIGN PATENT DOCUMENTS

| | | | |
|---|---|---|---|
| 1948970 | 6/1970 | Fed. Rep. of Germany | 280/752 |
| 65850 | 11/1955 | France | 74/552 |
| 301312 | 11/1954 | Switzerland | 180/90 |
| 1215803 | 12/1970 | United Kingdom | 180/90 |
| 1316722 | 5/1973 | United Kingdom | 280/752 |

*Primary Examiner*—Joseph F. Peters, Jr.
*Assistant Examiner*—Ross Weaver
*Attorney, Agent, or Firm*—Bielen & Peterson

[57] ABSTRACT

A dashboard and steering wheel assembly for a motor vehicle arranged with a front seat for driver and passenger safety, the assembly including a dashboard having a heavily padded, substantially flat, inclined surface substantially encompassing a padded steering wheel oriented flush with the inclined surface of the dashboard, the steering wheel having a structural construction to provide a cushioning effect substantially equal to the dashboard, the surface of the dashboard and flush oriented steering wheel being inclined at an angle and positioned with respect to the seat to maximize the contact area of a forward thrust driver and passenger on collision of the vehicle.

7 Claims, 3 Drawing Figures

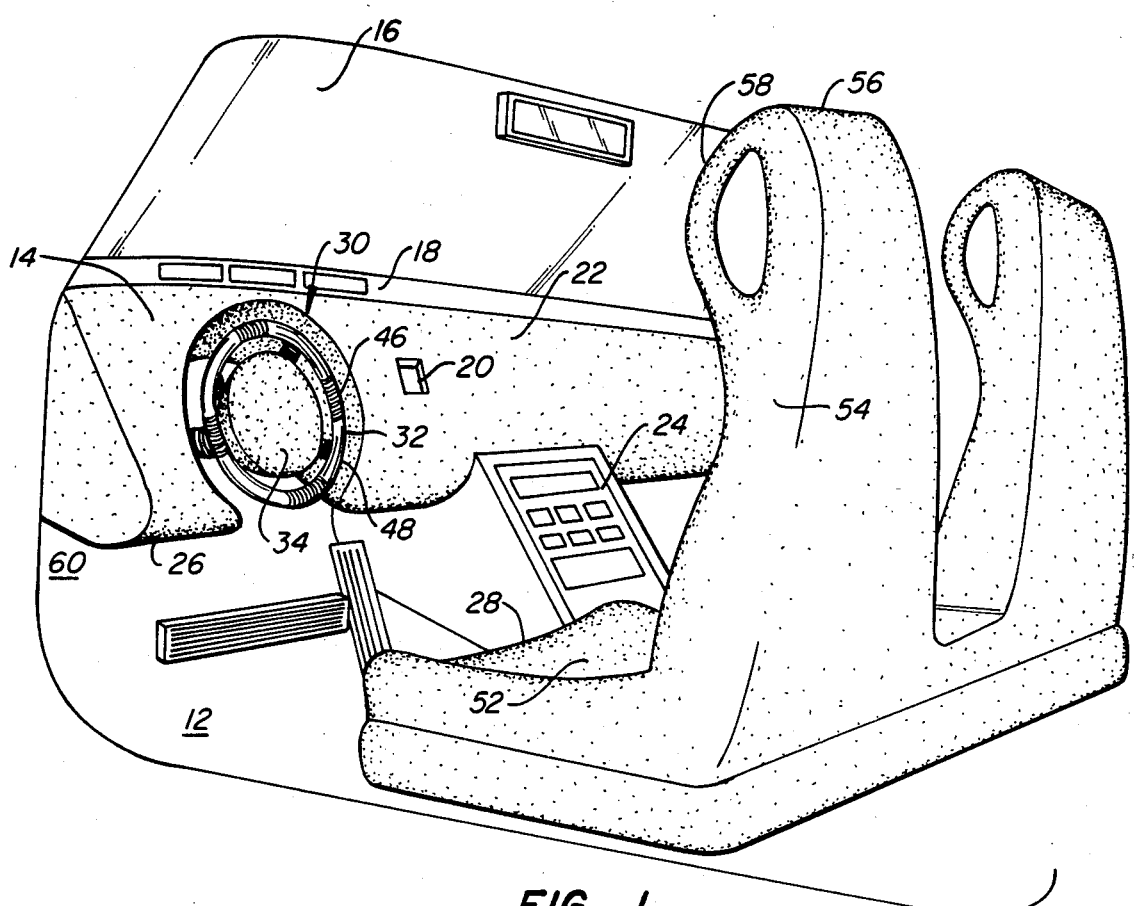
FIG._1.
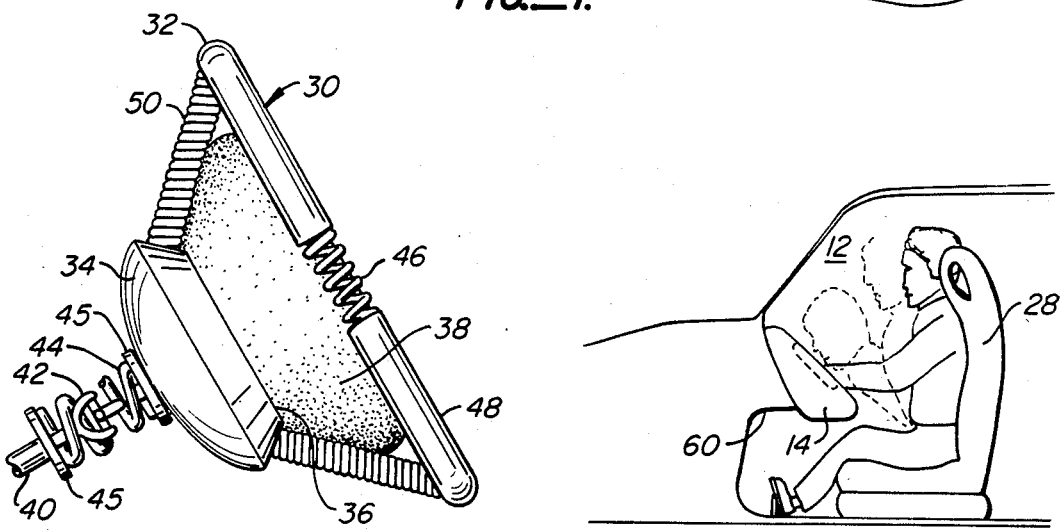
FIG._2.
FIG._3.

MOTOR VEHICLE DASHBOARD AND SEAT ARRANGEMENT

BACKGROUND OF THE INVENTION

This invention relates to a motor vehicle dashboard and seat arrangement to minimize injury to a driver and passenger on impact of a motor vehicle. In particular the dashboard is designed to absorb the impact of a forward thrust passenger on vehicle collision either when wearing a safety belt or more importantly when without a safety belt.

Although certain advances have been made in the interior design of motor vehicles to incorporate certain safety features the features actually implemented fall far short of a goal to minimize injury. Padding dashboards usually comprise a padded top cornice to an otherwise rigid and hard instrument panel. Steering wheel on occasion include a collapsible column connecting a rigid wheel that still cause substantial chest injury on major impacts. Most serious is the failure of the vehicle occupant to utilize the life saving seat belt mandatorily provided to reduce injury.

The object of this invention is to provide a vehicle dashboard and steering wheel arranged with the vehicle front seat and designed to minimize injury in the event the driver and for passenger has failed to use the seat belt as well as when the seat belt is used. Too often the vehicle occupants fail to employ their seat belts for a variety of reasons ranging from discomfort, failure to appreciate the life saving capability of the seatbelt, or the belief that an accident won't happen to them. It is therefore incumbant on the vehicle manufacturer to employ means other than or in addition to the seatbelt for passenger protection. The recently devised air bag, comprising an air expanded, cushioning bladder, inflatable on collision has certain disadvantages including loss of visibility and control or inflation, which may be undesirable for a less than major collision, where some control after initial impact is desirable to prevent secondary disaster in running off the road or into oncoming traffic.

The dashboard and seat arrangement of the invention attempts to provide an alternative to the recognized safety aspects of the airbag, without certain of the debilities.

SUMMARY OF THE INVENTION

The motor vehicle and seat arrangement of this invention is designed to minimize injury of a driver and/or passenger in the unfortunate event of a collision whether or not the front seat vehicle occupants are wearing their seat belts.

The dashboard includes a heavily padded substantially flat surface that is inclined at an angle to maximize the impact area of a forward thrust driver or passenger. The dashboard is constructed without rigid instruments and has the surface extended forward toward the passenger to a position flush with the steering wheel, which it substantially encompasses.

The steering wheel has a central heavily padded portion and a semirigid rim, which deform in conformity to the configuration of the driver on impact. The steering column has a spring post to provide a cushioning effect substantially equal to the padded dashboard to equalize the cushioning effect of the steering wheel and dashboard particularly for an off-center impact of the driver. The front seat is similarly heavily padded and contoured to the driver in bucket fashion with padded projecting head protectors for diagonal or side crashes. The front seat is positioned close to the forward advanced dashboard which has an extended lower edge which minimizes the space below the dashboard into which an occupant could otherwise be lodged.

These and other features will become apparent from a consideration of the preferred embodiment described hereinafter.

BRIEF DESCRIPTION OF THE DRAWINGS

FIG. 1 is a perspective view of the drawings.
FIG. 2 is a side view of the steering wheel.
FIG. 3 is a schematic view of a forward thrust occupant.

DETAILED DESCRIPTION OF THE PREFERRED EMBODIMENT

Referring to the perspective view of FIG. 1, a cut away view of a motor vehicle is shown to reveal the front compartment 12 incorporating the dashboard and seat arrangement of this invention.

The front compartment 12 has a dashboard 14 extending from the bottom of the front windshield 16 which includes a narrow instrument strip 18 at the junction of the dashboard and windshield. The dashboard is heavily padded and is without rigid instruments, which may cause injury, but may include thin, deformable indicators 20, which are recessed in the surface 22 of the dashboard and are displaceable with the surface on contact. For example, certain thin LEDs or liquid crystal displays that are float mounted or imbedded in the cushioning material may be acceptable where necessary. Primarily instrumentation is confined to an instrument console 24 mounted below the dashboard 14 between the driver and passenger portion of a contoured front seat 28.

The heavily padded dashboard is preferably constructed of synthetic foam material six inches to one foot in thickness. The forward surface 22 facing the driver and passenger is substantially flat and extends to a plane flush with a padded steering wheel 30. The surface 22 of the dashboard is spaced from and substantially encompasses the rim 32 of the steering wheel to maximize the surface area.

The flush mounted steering wheel and dashboard surface are inclined to maximize the area of impact of a forward thrust occupant on collision. On impact of the front of the vehicle with an object, a front seat occupant is thrust forward, partially pivoting at the waist as the legs impact a reactionary braking force to the hips. The forward and rotationally downward motion of the occupant is approximately 30° from the vertical at the time of impact at the forward positioned dashboard. The dashboard and flush mounted steering wheel are thereby inclined to a similar 30° angle for a flat impact of the occupant with the dashboard and steering wheel assembly. While the angle is somewhat greater for a passenger wearing a seat belt, the forward thrust being reduced by the belt, the dashboard and steering wheel assembly, though not at the ideal angle for a belted occupant, nevertheless provides a cushioning substantially more effective than conventional designs.

The steering wheel 30 has an enlarged hub 34 with a large horn disc 36 covered with a foam padding 38 which when depressed will activate the horn signal. The hub 34 is joined to a spring column 40 having a universal joint 42 and one or more large compression springs 44 sandwiched between two post mounted discs 45 to allow some tilt of the wheel on impact. The spring are designed with flat coils to resist torsional forces that would adversely affect steering while providing cushioning along the axis of the springs.

The steering wheel rim 32 is flexible, including four spring segments 46 interrupting rigid rim segments 48 and is connected to the hub by spring spokes 50 to provide the rim with a deformation characteristic similar to the padded double spring column 40. The spring segment 46 and spokes 50 have a flexible covering to prevent pinching on impact. The resistance to deformation of the steering is similar to the padded dashboard for the equivalent area to provide a relatively uniform cushioning effect on impact of the driver with the steering wheel whether from a head on or diagonal impact of the vehicle with an object.

The front seat 28 has a heavily padded, contoured, seat portion 52 with a heavily padded contoured seat back 54 to inhibit side motion and assist in directing an occupant forward toward the dashboard assembly. The top of the seat includes a head rest 56 with projecting head protectors 58, comprising padded curved bars to maximize side visibility while affording lateral protection for a side collision.

The extended front edge of the seat portion relative to conventional seats and close proximity of the seat to the forward positioned lower edge of the dashboard assembly minimizes the underspace 60 of the dashboard to inhibit an occupant from being thrown under the dash with the increased potential for injury.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A dashboard and steering wheel assembly for a motor vehicle, the assembly comprising:

(a) a deformable dashboard having a heavily padded, substantially flat inclined surface, wherein the angle of inclination of the inclined surface is selected to maximize the area of impact of a forward and rotationally downward moving occupant on collision; and (b) a deformable steering wheel having a flexible rim and a recessed hub connected to said rim by flexible spokes, said hub having padding with a top surface substantially flush with said rim, wherein said inclined surface of said dashboard is spaced from, substantially encompasses and is substantially flush with the steering wheel rim, wherein said steering wheel elements combine to form a resilient structure which provides resistance to deformation similar to the resistance to deformation of said padded dashboard for the equivalent area on impact by the occupant whether from a direct or off-center impact from a head-on or diagonal collision of the vehicle.

2. The dashboard steering wheel assembly of claim 1 wherein said hub has a spring column permitting cushioning displacement on the spring axis on impact.

3. The dashboard and steering wheel assembly of claim 2, wherein said spring column includes a universal joint.

4. The dashboard and steering wheel assembly of claim 1 wherein said dashboard surface is inclined at an approximate 30° angle from the vertical.

5. The dashboard and steering wheel assembly of claim 1 in combination with a heavily padded front seat having a contoured seat portion and a contoured seat back to inhibit lateral displacement of the occupant.

6. The dashboard and steering wheel assembly of claim 4 wherein said dashboard has a lower edge and said seat portion has an extended front edge proximate the lower edge of said dashboard.

7. The dashboard and steering wheel assembly of claim 4 wherein said seat back has a head rest with head protectors for protecting the occupants head on side collisions.

* * * * *